United States Patent
Somoskői et al.

(10) Patent No.: US 9,001,687 B2
(45) Date of Patent: Apr. 7, 2015

(54) PACKET INTERCEPTION AND TIMESTAMPING FOR ERROR ESTIMATION IN ACTIVE MEASUREMENT PROTOCOLS

(71) Applicant: Telefonakitiebolaget L M Ericsson (Publ), Stockholm (SE)

(72) Inventors: Attila Somoskői, Budapest (HU); Samita Chakrabarti, Sunnyvale, CA (US); Brian Alleyne, Los Gatos, CA (US); Tamás Éltető, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 196 days.

(21) Appl. No.: 13/857,825

(22) Filed: Apr. 5, 2013

(65) Prior Publication Data
US 2014/0301215 A1 Oct. 9, 2014

(51) Int. Cl.
*H04L 12/26* (2006.01)

(52) U.S. Cl.
CPC .......... *H04L 43/0852* (2013.01); *H04L 43/106* (2013.01); *H04L 43/50* (2013.01); *H04L 43/0858* (2013.01); *H04L 43/028* (2013.01); *H04L 43/04* (2013.01); *H04L 43/0835* (2013.01); *H04L 43/0841* (2013.01); *H04L 43/0864* (2013.01)

(58) Field of Classification Search
USPC ............................................. 370/252, 236.1
See application file for complete search history.

(56) References Cited

U.S. PATENT DOCUMENTS 8,064,356 B1 * 11/2011 Krzanowski et al. ......... 370/252
2003/0012136 A1 * 1/2003 Walles ........................... 370/229
2006/0285501 A1 * 12/2006 Damm ........................... 370/252
2013/0100816 A1 * 4/2013 Bergamasco et al. ......... 370/237
2014/0029442 A1 * 1/2014 Wallman .................... 370/241.1

FOREIGN PATENT DOCUMENTS

WO WO-0188667 11/2001

OTHER PUBLICATIONS

S. Baillargeon et al., "Ericsson TWAMP Value-Added Octets Draft-IETF-IPPM-TWAMP-Value-Added-Actets-05.Txt", 18 pages, Ericsson, Jul. 19, 2012, http://tools.ietf.org/html/draft-ietf-ippm-twamp-value-added-actets-05.

K. Hedayat et al., "A Two-Way Active Measurement Protocol (TWAMP)", 26 pages, Nortel Networks, Oct. 2008, http://tools.ietf.org/html/rfc5357.

(Continued)

*Primary Examiner* — Albert T Chou
(74) *Attorney, Agent, or Firm* — Blakely Sokoloff Taylor & Zafman LLP

(57) ABSTRACT

A method in a network device. The method is one of estimating a time delay between when a software timestamp is generated for an active measurement protocol test packet and when the active measurement protocol test packet is transmitted from the network device onto a link. The method includes generating an error estimation packet, generating a software timestamp (ts) for the error estimation packet, and transmitting the error estimation packet toward a network interface. The method also includes intercepting the error estimation packet before it is transmitted from the network device onto the link, and generating an interception timestamp (ti) for the error estimation packet after intercepting the error estimation packet. The time delay is estimated based on a difference between the interception timestamp and the software timestamp.

18 Claims, 4 Drawing Sheets

(56) References Cited

OTHER PUBLICATIONS

"PCAP", From Wikipedia, 4 pages, Apr. 3, 2013, http://en.wikipedia.org/wiki/Pcap.

Shalunov, S., et al., "A One-way Active Measurement Protocol (OWAMP)", Sep. 2006, 56 pages, *Network Working Group, Request for Comments 4656, The Internet Society*.

Donnelly, Stephen, et al., "Passive Calibration of an Active Measurement System", May 1, 2001, 8 pages, downloaded from http://wand.net.nz/pubs/10/pdf/calibration.pdf.

Staehle, Barbara, et al., "Measuring One-Way Delay in Wireless Mesh Networks—An Experimental Investigation", pp. 31-38, PM2HW2N'09, Oct. 26, 2009, Tenerife, Canary Islands, Spain, ACM.

* cited by examiner

PACKET INTERCEPTION AND TIMESTAMPING FOR ERROR ESTIMATION IN ACTIVE MEASUREMENT PROTOCOLS

BACKGROUND

1. Field

Embodiments of the invention relate to the field of networking; and more specifically, to performance measurement in networking.

2. Background Information

In the field of networking it is often desirable to be able to measure or monitor network performance. By way of example, it may be desirable to be able to measure or monitor one-way delays, round-trip delays, jitter, and the like. On the one hand, the ability to measure or monitor such metrics may be used to help debug problems, understand the source of problems, or improve network performance. On the other hand, the ability to measure or monitor such metrics may be used to help evaluate levels of service and/or to help ensure compliance with service-level agreements (SLAs).

Various network measurement protocols are known in the arts. One-Way Active Measurement Protocol (OWAMP) is described in RFC 4656. OWAMP may be used to measure unidirectional or one-way metrics/characteristics, such as one-way delay and one-way loss, between two network devices. The measurement may be in either direction between the two network devices. Two-Way Active Measurement Protocol (TWAMP) is described in RFC 5357. TWAMP is based on OWAMP. TWAMP may be used to measure two-way or round-trip metrics/characteristics, such as two-way delay and round-trip loss, between two network devices. These protocols may be used to measure or characterize the behavior of mobile broadband networks, IP networks, and other networks at a given point in time.

Both OWAMP and TWAMP rely on software calculated timestamps in packets transmitted between the two network devices over a link in order to make the measurements. Ideally, the software calculated timestamps should be calculated at precisely the time that the packets are transmitted on and/or received from the link. However, in practice the times that the packets are transmitted on and/or received from the links may differ from the software calculated timestamps. The difference may be due in part to various combinations of factors, such as, for example, the particular architectures of the network devices, the software used in the network devices, the particular data plane configuration, and the like. By way of example, in some cases the difference in such times may be on the order of a few to tens of milliseconds. Such differences may tend to limit the accuracy of the measurements available from these protocols.

SUMMARY

In one aspect, a method in a network device is disclosed. The method is one of estimating a time delay between when a software timestamp is generated for an active measurement protocol test packet and when the active measurement protocol test packet is transmitted from the network device onto a link. The method includes steps of generating an error estimation packet, generating a software timestamp for the error estimation packet, and transmitting the error estimation packet toward a network interface. The method also includes steps of intercepting the error estimation packet before it is transmitted from the network device onto the link, and generating an interception timestamp for the error estimation packet in response to intercepting the error estimation packet. The method also includes a step of estimating the time delay based on a difference between the interception timestamp and the software timestamp. Advantageously, this method may help to allow estimating the time delay which may be used to improve the accuracy of metrics calculated with the active measurement protocol.

In another aspect, a network device is disclosed. The network device is operable to be deployed in a network and coupled with another network device by a link. The network device is operable to estimate a time delay between when a software timestamp is generated for an active measurement protocol test packet and when the active measurement protocol test packet is transmitted from the network device onto a link. The network device includes a network interface and an error estimation packet generation module that is operable to generate an error estimation packet. The network device also includes a software timestamp generation module that is operable to generate a software timestamp for the error estimation packet. The network device further includes a packet interceptor module that is operable to intercept the error estimation packet before it is transmitted from the network interface onto the link. An interception timestamp generation module of the network device is operable to generate an interception timestamp for the error estimation packet in response to the interception of the error estimation packet. The network device also includes an error estimation module that is operable to estimate the time delay based on a difference between the interception timestamp and the software timestamp. Advantageously, the network device may use the estimated time delay to improve the accuracy of active measurement protocol metrics.

In yet another aspect, a method in a TWAMP sender network device is disclosed. The method is one of estimating a time delay between when a software timestamp is generated for a TWAMP test packet and when the TWAMP test packet is transmitted from the TWAMP sender network device onto a link. The method includes steps of generating an error estimation packet, generating a software timestamp for the error estimation packet, and transmitting the error estimation packet toward a network interface. The method also includes capturing the error estimation packet before it is transmitted from the network device onto the link with a packet capture module selected from a pcap module and a WinPcap module. The method also includes generating an interception timestamp for the error estimation packet in response to intercepting the error estimation packet. The method further includes estimating the time delay based on a difference between the interception timestamp and the software timestamp. Advantageously, the method allows the time delay to be estimated and the estimated time delay may help to improve the accuracy of metrics calculated by TWAMP.

In a still further aspect, a TWAMP sender network device is disclosed. The TWAMP sender network device is operable to be deployed in a network and coupled with a TWAMP reflector network device by a link. The TWAMP sender network device is operable to estimate a time delay between when a software timestamp is generated for a TWAMP test packet and when the TWAMP test packet is transmitted from the TWAMP sender network device onto a link. The TWAMP sender network device includes a network interface and an error estimation packet generation module that is operable to generate an error estimation packet. The TWAMP sender network device also includes a software timestamp generation module that is operable to generate a software timestamp for the error estimation packet. The TWAMP sender network device further includes a packet capture module selected from a pcap module and a WinPcap module, the packed capture module operable to capture the error estimation packet before it is transmitted from the network interface onto the link. The TWAMP sender network device includes an interception timestamp generation module that is operable to generate an interception timestamp for the error estimation packet in response to the interception of the error estimation packet. The TWAMP sender network device also includes an error estimation module that is operable to estimate the delay based at least in part on a difference between the interception timestamp and the software timestamp. Advantageously, estimated delay may help to improve the accuracy of metrics calculated by the TWAMP sender network device.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods and apparatus to intercept and timestamp packets for error estimation in TWAMP, OWAMP, and other active measurement protocols. In the following description, numerous specific details are set forth. For example, specific active measurement protocols, ways of intercepting packets, logic implementations, logic partitioning/integration choices, types and interrelationships of system components, and the like, and are set forth. However, it is understood that embodiments of the invention may be practiced without these specific details. In other instances, well-known circuits, structures and techniques have not been shown in detail in order not to obscure the understanding of this description.

Figure 1:
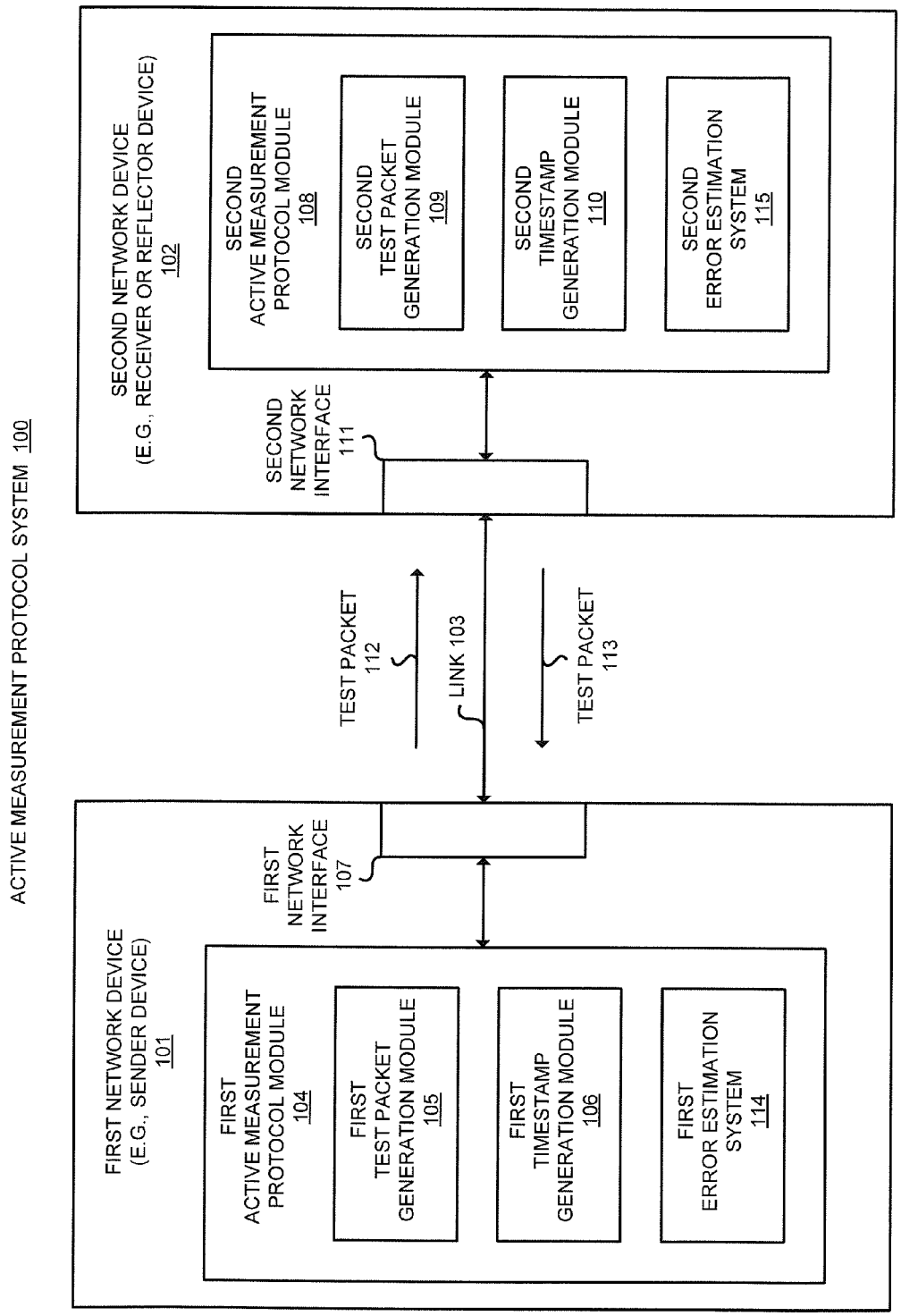
FIG. 1 is a block diagram of an embodiment of an active measurement protocol system suitable for implementing embodiments.

FIG. 1 is a block diagram of an embodiment of an active measurement protocol system 100 suitable for implementing embodiments. The active measurement protocol system includes a first network device 101 and a second network device 102. The first network device and the second network device are operable to be coupled by a link 103. In some embodiments, the active measurement protocol system is a TWAMP system, the first network device is a sender device, and the second network device is a reflector device. In other embodiments, the active measurement protocol system is an OWAMP system, the first network device is a session sender network device, and the second network device is a session receiver network device.

The first network device 101 includes a first active measurement protocol module 104 that is operable to perform an active measurement protocol. In some embodiments, the first active measurement protocol module may be a TWAMP module. In other embodiments, the first active measurement protocol module may be an OWAMP module. The first active measurement protocol module includes a first test packet generation module 105 that is operable to generate test packets. The first active measurement protocol module also includes a first timestamp generation module 106 that is operable to generate timestamps (e.g., in a conventional way used in TWAMP or OWAMP). The first active measurement protocol module is coupled with, or otherwise in communication with, a first network interface 107. The first active measurement protocol module may transmit generated test packets having generated timestamps to the first network interface and then onto the link 103. As shown, test packets 112 having the timestamps may be transmitted to the second network device over the link. The timestamp generation module may also generate timestamps for test packets received from the link and provided to the first active measurement protocol module.

The second network device 102 includes a second active measurement protocol module 108 that is operable to perform the active measurement protocol. In some embodiments, the second active measurement protocol module may be a TWAMP module. In other embodiments, the second active measurement protocol module may be an OWAMP module. The second active measurement protocol module includes a second test packet generation module 109 that is operable to generate test packets. The second active measurement protocol module also includes a second timestamp generation module 110 that is operable to generate timestamps. The second active measurement protocol module is coupled with, or otherwise in communication with, a second network interface 111. The timestamp generation module may generate timestamps for test packets received from the link and provided to the second active measurement protocol module. In some embodiments, for example in a TWAMP embodiment, or in an embodiment where the second network device is operating as an OWAMP sender device, the second active measurement protocol module may include the test packet generation module 109 to generate test packets. The second active measurement protocol module may include generated timestamps in the generated test packets and transmit them toward the second interface and then onto the link. The first and second active measurement protocol modules may perform an active measurement test in which test packets are exchanged between the active measurement protocol modules. As shown, test packets 113 may be transmitted to the first network device over the link.

Ideally, the timestamps calculated by the active measurement protocol modules and/or the timestamp generation modules should be calculated at precisely the time that the packets are transmitted on and/or received from the link. However, in practice the times that the packets are transmitted on and/or received from the links may differ from the times when the timestamps are calculated. Simply put, it may take some time for packets to be transferred between the network interfaces and the active measurement protocol modules and/or the timestamp generation modules. By way of example, such delays may be due to various factors, such as, for example, times needed to pass through protocol stacks, times needed to process the packets, times the packets are held in queues or buffers, and other hardware and/or software delays. The particular delays may vary from one network device to another depending on various factors, such as, for example, the particular architectures of the network devices, the particular software used in the network devices, and the like.

Moreover, the particular delays typically vary over time, such as, for example, due to instantaneous loads, instantaneous or changing conditions within the network devices, and the like. As a result, often fixed or static estimates of the delays do not provide the needed accuracy. In some cases the delays may be on the order of a few to tens of milliseconds. Such delays generally tend to limit the accuracy of the active measurement protocols. Moreover, improvements in the accuracy of these active measurement protocols are generally becoming more important over time due in part to higher data rates, more traffic, and the like.

Referring again to FIG. 1, the first network device 101 includes an embodiment of a first error estimation system 114. The second network device 102 includes an embodiment of a second error estimation system 115. In some embodiments, the first and second error estimation systems may be operable to estimate the differences between the times when the packets are transmitted on and/or received from the links and the times when the timestamps are calculated. Advantageously, in some embodiments, such estimates may help to improve the accuracy of the active measurement protocols.

Figure 2:
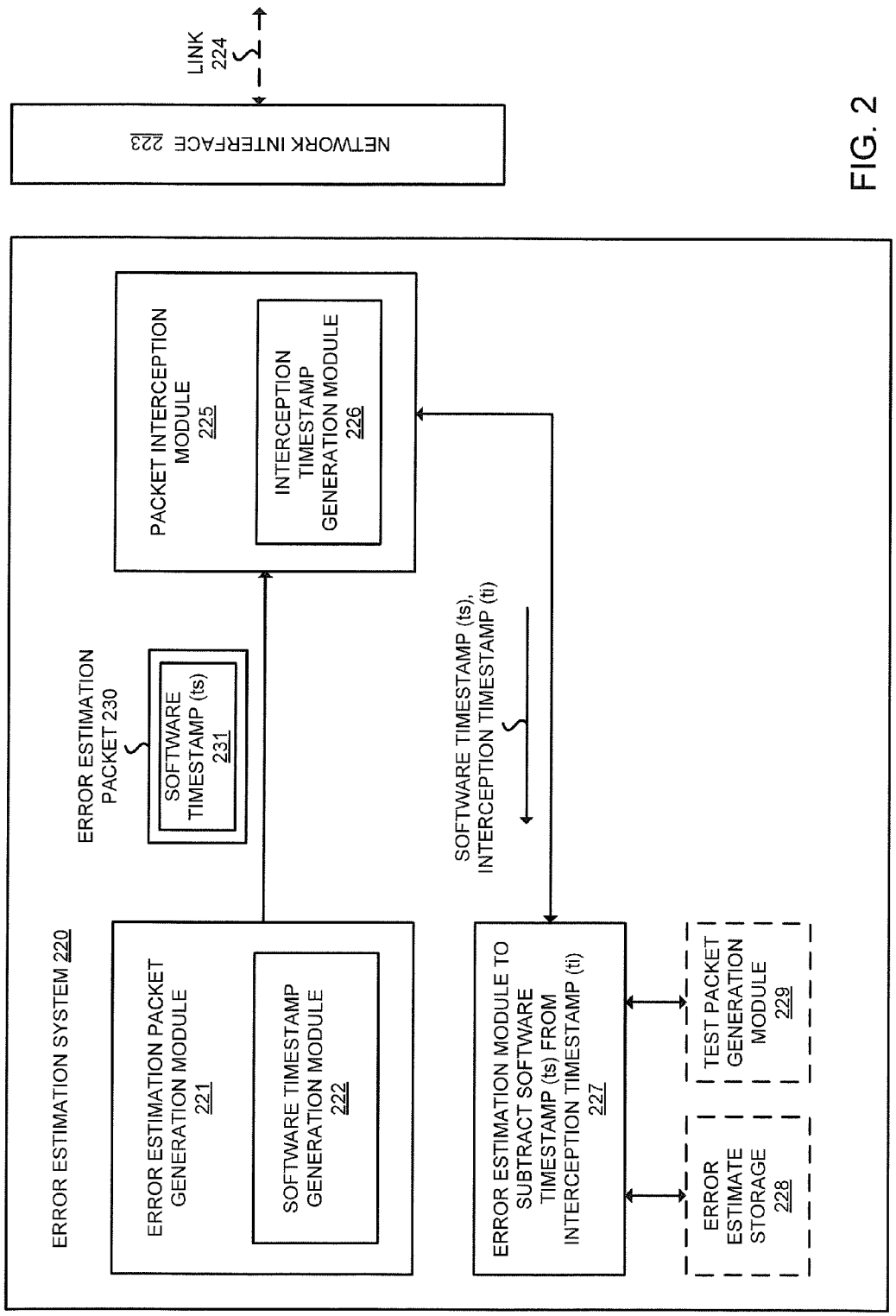
FIG. 2 is a block diagram of an embodiment of an error estimation system that is operable to estimate a time delay between when a software timestamp is generated for an active measurement protocol test packet and when the active measurement protocol test packet is transmitted from a network device onto a link.

FIG. 2 is a block diagram of an embodiment of an error estimation system 220 that is operable to estimate a time delay between when a software timestamp is generated for an active measurement protocol test packet and when the active measurement protocol test packet is transmitted from a network device onto a link 224. In some embodiments, the error estimation system of FIG. 2 may be included in either of the network devices of FIG. 1. Alternatively, the error estimation system may be included in similar or different network devices. Moreover, the network devices of FIG. 1 may include similar or different error estimation systems.

The illustrated error estimation system includes an error estimation packet generation module 221. The error estimation packet generation module 221 is operable to generate an error estimation packet that is useful for error estimation. In some embodiments, the error estimation packet generation module may generate an error estimation shadow packet at around the same time as an active measurement protocol test packet so that the error estimation shadow packet "shadows" the active measurement protocol test packet. In various embodiments, the error estimation packet may be sent substantially concurrently with the active measurement protocol test packet, immediately or very soon before the active measurement protocol test packet, or immediately or very soon after the active measurement protocol test packet. In other embodiments, multiple error estimation packets may be sent at multiple such times. Advantageously, when the error estimation shadow packet is generated at around the same time as the active measurement protocol test packet they should both reflect approximately the same delays due to instantaneous loads, network conditions, and the like.

The error estimation packet generation module includes a timestamp generation module 222. In some embodiments, the timestamp generation module may generate a software timestamp (ts) using an approach similar to, or the same as, that used in TWAMP and/or OWAMP. For example, in some embodiments, the timestamp generation module may generate the software timestamp (ts) at the same level in a software protocol stack as a timestamp generation module used in TWAMP or OWAMP. The generated timestamp (ts) may be included in the error estimation packet. As shown, the error estimation packet 230 having the generated software timestamp (ts) 231 may be transmitted from the error estimation system toward a network interface 223 and/or a network link 224.

In some embodiments, a packet interceptor module 225 may capture or otherwise intercept the error estimation packet having the generated software timestamp (ts) before it is transmitted onto the link 224. In some embodiments, the packet interceptor module may intercept the error estimation packet just prior to and/or substantially close to the time when it would be transmitted onto the link, although this is not required. Advantageously, the closer the time of capture to the time that the error estimation packet would be transmitted onto the link, the greater the reduction in the error and/or the greater the improvement in the active measurement protocol accuracy. In other embodiments, the packet interceptor module may intercept the error estimation packet anytime between the software timestamp generation and the time when the error estimation packet would be transmitted onto the link to provide some of this benefit. The error estimation packet may not actually be transmitted on the link.

In some embodiments, the packet interceptor module may include a packet capture module. Examples of suitable packet capture modules include, but are not limited to, pcap in the libpcap library of Unix and/or Linux, and WinPcap in Windows® from Microsoft Corporation. Pcap is commonly used for packet capturing and filtering in Unix and Linux. By way of example, when using pcap in Linux, a pcap enabled TWAMP session sender (PSender) and a pcap enabled session reflector (PReflector) may both set up pcap at the start of a session. The pcap may be configured to use as a key the IP address src and src port. The pcap_setup_capture(pcap_interface) may start listening on the specified interface. The pcap_update_capture(src_addr, src_port) may set the filter expression to be used for filtering the packets: src ${src_addr} and src port ${src_port}, where src_addr is the local IP address and src_port is the local port.

In other embodiments, the packet interceptor module may include a media access controller (MAC) that is operable to capture a packet (e.g., having a trigger to capture the packet). In still other embodiments, any other module or mechanism that is operable to intercept the error estimation packet between the software timestamp generation and the time when it would be transmitted onto the link, may potentially be used. In some embodiments, the error estimation packet may have a tag, or other feature to distinguish it from an active measurement protocol test packet, to help allow the packet interceptor module to know to intercept it.

The packet interceptor module 225 includes an interception timestamp generation module 226. The interception timestamp generation module is operable to generate an interception timestamp (ti) at substantially the time when the error estimation packet is intercepted. In some embodiments, the packet interceptor module may provide the timestamp (ts) and the interception timestamp (ti) to an error estimation module 227. In some embodiments, the error estimation module may be operable to determine the difference between the interception timestamp (ti) and the software timestamp (ts). For example, the error estimation module may subtract the software timestamp (ts) from the interception timestamp (ti). Advantageously, this difference in time may represent an error estimate. This error estimate may help to estimate or quantify the difference between the time when an active measurement protocol test packet is initially time stamped in software and the time when that test packet is transmitted onto the link.

Such a time difference or error estimate may be used in different ways in different embodiments. As shown, in some embodiments, the error estimate may be stored in error estimate storage 228 for future use (e.g., in increasing the accuracy of the active measurement protocol). As one example, in some embodiments, the error estimate may be stored along with a sequence number of an active measurement protocol test packet until a corresponding reflected test packet is returned (e.g., in TWAMP) and then the error estimate may be used along with an error estimate in the reflected test packet to increase the accuracy of the active measurement protocol. The sequence number of the reflected active measurement protocol test packet may be used to locate the stored/preserved error estimate. Either the error estimation packet may have the same sequence number as the active measurement protocol test packet, or it may be implicitly understood that the error estimation packet corresponds to the sequence number as the active measurement protocol test packet. Alternatively, instead of a sequence number, other information sufficient to identify the active measurement protocol test packet may be used. As another example, in some embodiments, the error estimate may be stored and used for a certain period of time while the delays are expected to stay the same and then refreshed when needed (e.g., when the instantaneous loads and/or conditions in the network device change and/or the delays otherwise change).

In other embodiments, the error estimate may be provided to an active measurement protocol test packet generation module 229 (e.g., the test packet generation module 105 or 109). In some embodiments, the test packet generation module may include the error estimate in an active measurement protocol test packet. For example, the error estimate may be included in an error estimate, or sender error estimate field, of a TWAMP packet.

Figure 3:
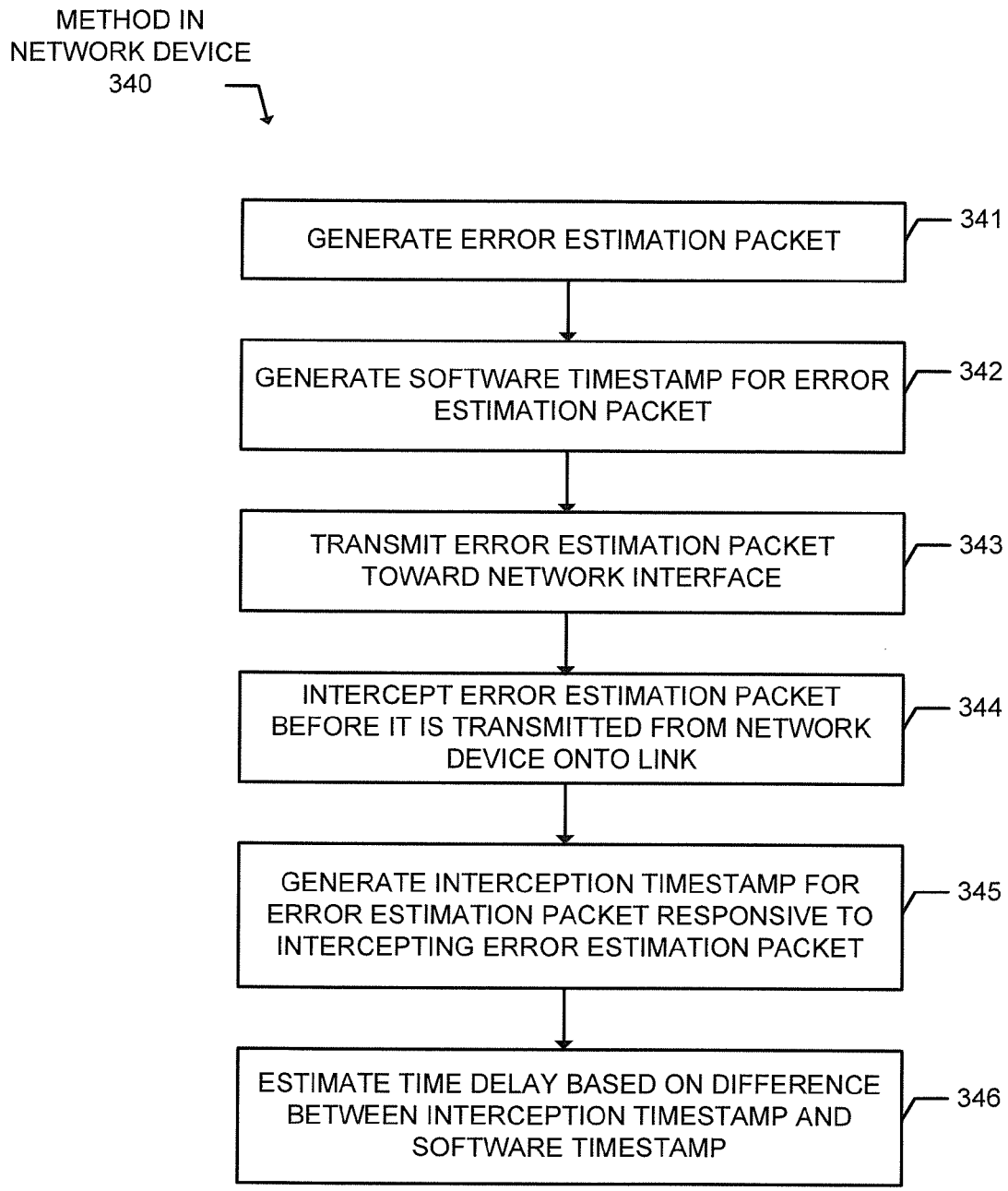
FIG. 3 is a block flow diagram of an embodiment of a method of estimating a time delay between when a software timestamp is generated for an active measurement protocol test packet and when the active measurement protocol test packet is transmitted from a network device onto a link.

FIG. 3 is a block flow diagram of an embodiment of a method 340 of estimating a time delay between when a software timestamp is generated for an active measurement protocol test packet and when the active measurement protocol test packet is transmitted from a network device onto a link. In some embodiments, the method of FIG. 3 may be performed by and/or within either one of the network devices of FIG. 1 and/or within the error estimation system of FIG. 2. Alternatively, the method of FIG. 2 may be performed by similar or different network devices or error estimation systems. Moreover, the network devices of FIG. 1 and/or the error estimation system of FIG. 2 may perform similar or different methods than that of FIG. 3.

The method includes generating an error estimation packet, at block 341. In some embodiments, the error estimation packet may be generated immediately before, or immediately after, generating the active measurement protocol test packet. A software timestamp is generated for the error estimation packet, at block 342. The method includes transmitting the error estimation packet toward the network interface, at block 343.

The method includes intercepting the error estimation packet before it is transmitted from the network device onto the link, at block 344. In some embodiments, intercepting the error estimation packet may include capturing the error estimation packet with a packet capture module. Examples of suitable packet capture modules include, but are not limited to, pcap modules and WinPcap modules. In other embodiments, the error estimation packet may be intercepted with a media access controller (MAC), or any other suitable mechanism for intercepting the error estimation packet at a time very close to when it would be transmitted onto the link. The method includes generating an interception timestamp for the error estimation packet after intercepting the error estimation packet, at block 345.

The method includes estimating the time delay based on a difference between the interception timestamp and the software timestamp, at block 346. In some embodiments, the estimated time delay may be used to estimate a metric in a TWAMP protocol and/or an OWAMP protocol.

Figure 4:
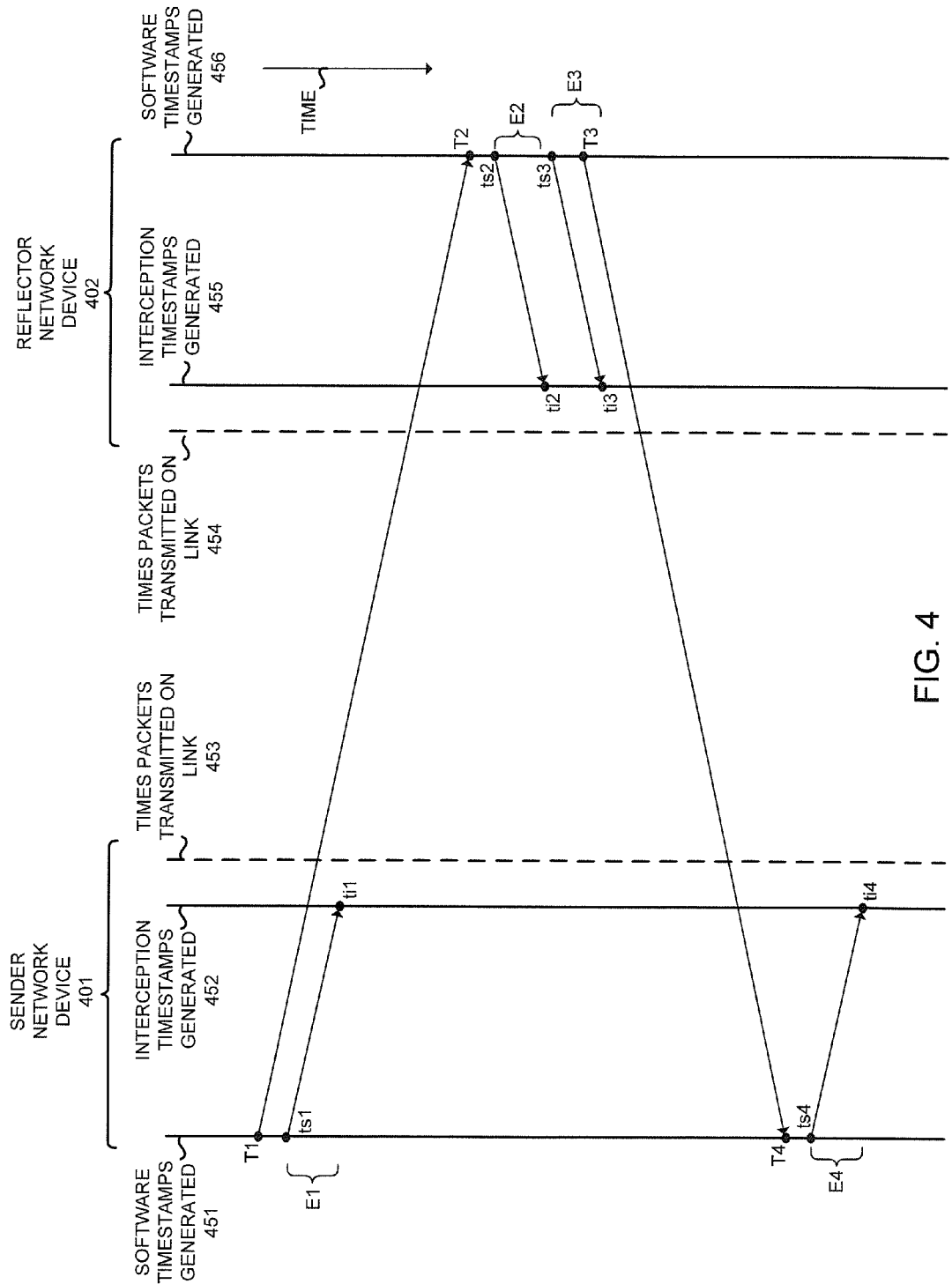
FIG. 4 illustrates an embodiment of how packet interception and interception timestamps may be used in a TWAMP protocol.

FIG. 4 illustrates an embodiment of how packet interception and interception timestamps may be used in a TWAMP protocol. Time is plotted increasing from the top to the bottom in the illustration. Six vertical lines are used to show relative times when various events take place within a sender network device 401 and a reflector network device 402. The sender and reflector network devices are coupled by a network 403.

TWAMP uses four different software-generated timestamps T1, T2, T3, and T4 to calculate two-way or round-trip measurements between the sender network device and a reflector network device. A first (leftmost) vertical line 451 represents times when software timestamps are generated in the sender network device 401. A sixth (right most) vertical line 456 represents times when software timestamps are generated in the reflector network device 402.

T1 is a software timestamp generated when a TWAMP test packet is generated in the sender network device. T2 is a software timestamp generated when the TWAMP test packet is processed by software in the reflector network device. T3 is a software timestamp generated when a TWAMP reflected test packet is generated in the reflector network device. T4 is a software timestamp generated when the TWAMP reflected test packet is processed by software in the sender network device. The difference T2-T1 represents an estimate of the forward one-way delay. The difference T4-T3 represents an estimate of the reverse one-way delay.

A third (dashed) vertical line 453 represents times when outbound packets are actually transmitted out of the sender network device onto the link and times when inbound packets are actually received at the sender network device from the link. Likewise, a fourth (dashed) vertical line 454 represents times when inbound packets are actually received at the reflector network device from the link and times when outbound packets are actually transmitted out of the reflector network device onto the link. As clearly shown by these dashed lines, the times when the packets are actually transmitted onto or received from the link differ from the times when the software timestamps are generated due to the delays discussed elsewhere herein.

In some embodiments, error estimation packets may be used to estimate these delays between the software timestamp generation and the actual appearance of the packets on the links. In some embodiments, four error estimation packets may be used in TWAMP. For each of these four error estimation packets, two timestamps may be used. Namely, these two timestamps include a software timestamp (ts) and a packet interception timestamp (ti). A second vertical line 452 represents times when interception timestamps are generated in the sender network device after the error estimation packets have been intercepted near the time they would be transmitted on the link. A fifth vertical line 455 represents times when interception timestamps are generated in the reflector network device after the error estimation packets have been intercepted near the time they would be transmitted on the link. Each of these four error estimation packets and/or each of these four pairs of software and interception timestamps may be used to generate a corresponding error estimate (E).

In some embodiments, the sender network device may use a first error estimation packet around the time when the TWAMP test packet is generated and timestamped (e.g., at around the time of the timestamp T1). As shown, a first software timestamp ts1 may be generated when the first error estimation packet is generated in the sender network device. In some embodiments, the first software timestamp may be generated with an approach similar to or the same as that used to generate the software timestamps in TWAMP and/or OWAMP. A first interception timestamp (ti1) may be generated after the first error estimation packet has been intercepted within the sender network device. In various embodiments, the first error estimation packet may be captured by a packet capture module, intercepted by a MAC, or intercepted by any other mechanism known in the arts for intercepting a packet between the time when the first software timestamp (ts1) is generated and when the first error estimation packet would be sent out on the link at the third dashed line 453. A difference between the first interception timestamp (ti1) and the first software timestamp (ts1) represents a first error estimate (E1).

In the illustrated embodiment, the first error estimation packet is shown to be generated and timestamped after the test packet is timestamped at T1. In another embodiment, the first error estimation packet may be generated and timestamped before the test packet is timestamped at T1. In such an embodiment, the first error estimate (E1) may optionally be included in the test packet (e.g., in a sender error estimate field of the test packet) that is sent to the reflector network element. Subsequently, the first error estimate (E1) may be returned in the sender error estimate field of the reflected test packet and thereafter extracted and used for error reduction. Alternatively, the first error estimate (E1) may instead be stored or otherwise preserved locally, for example, along with a sequence identifier of the corresponding test packet. In yet another embodiment, two error estimation packets may be generated and timestamped both right before and right after the test packet is timestamped at T1, and then the differences between the software and interception timestamps may be averaged, which may tend to help improve accuracy in estimating the delay.

Similarly, in some embodiments, the reflector network device may use a second error estimation packet around the time when the TWAMP test packet is timestamped by software in the reflector network device (e.g., at around the time of the timestamp T2). As shown, a second software timestamp ts2 may be generated when the second error estimation packet is generated in the reflector network device. In some embodiments, the second software timestamp (ts2) may be generated with an approach similar to or the same as that used to generate the software timestamps in TWAMP and/or OWAMP. A second interception timestamp (ti2) may be generated after the second error estimation packet has been intercepted within the reflector network device. In various embodiments, the second error estimation packet may be captured by a packet capture module, intercepted by a MAC, or intercepted by any other mechanism known in the arts for intercepting a packet between the time when the second software timestamp (ts1) is generated and when the second error estimation packet would be sent out on the link at the fourth dashed line 454. A difference between the second interception timestamp (ti2) and the second software timestamp (ts2) represents a second error estimate (E2).

In some embodiments, the reflector network device may use a third error estimation packet around the time when the TWAMP reflected test packet is generated and timestamped by software in the reflector network device (e.g., at around the time of the timestamp T3). As shown, a third software timestamp ts3 may be generated when the third error estimation packet is generated in the reflector network device. In some embodiments, the third software timestamp (ts3) may be generated with an approach similar to or the same as that used to generate the software timestamps in TWAMP and/or OWAMP. A third interception timestamp (ti3) may be generated after the third error estimation packet has been intercepted within the reflector network device. In various embodiments, the third error estimation packet may be captured by a packet capture module, intercepted by a MAC, or intercepted by any other mechanism known in the arts for intercepting a packet between the time when the third software timestamp (ts3) is generated and when the third error estimation packet would be sent out on the link at the fourth dashed line 454. A difference between the third interception timestamp (ti3) and the third software timestamp (ts3) represents a third error estimate (E3).

In the illustrated embodiment, both the second error estimate (E2) and the third error estimate (E3) are used, although this is not required. In another embodiment, only either one, but not both, of the second error estimate (E2) and third error estimate (E3) may be used. The second and third error estimation packets are typically generated and timestamped at relatively close points in time and generally should have relatively similar delays. In such embodiments, only one of the second and third error estimates may be measured and it may be used as an estimate of both of the delays. In yet another optional embodiment, rather than using the second and third error estimation packets to obtain the second and third error estimates, an error estimation packet may be used periodically (e.g., at fixed intervals, not necessarily relative to the timestamps T2 or T3, etc.) and the most current version of the error estimate may be used for both E2 and E3. Other embodiments are also contemplated. In various embodiments, the second error estimate (E2), the third error estimate (E3), the sum of the second error estimate (E2) and the third error estimate (E3), or an average of the second error estimate (E2) and the third error estimate (E3), may be returned in the reflected test packet (e.g., in the error estimate field of the reflected test packet). The sender network device may be operable to extract the error estimate(s) from the reflected test packet and use it/them for error estimation and/or to improve the accuracy of measured metrics.

In some embodiments, the sender network device may use a fourth error estimation packet around the time when the TWAMP reflected test packet is timestamped by software within the sender network device (e.g., at around the time of the timestamp T4). As shown, a fourth software timestamp ts4 may be generated when the fourth error estimation packet is generated in the sender network device. In some embodiments, the fourth software timestamp may be generated with an approach similar to or the same as that used to generate the software timestamps in TWAMP and/or OWAMP. A fourth interception timestamp (ti4) may be generated after the fourth error estimation packet has been intercepted within the sender network device. In various embodiments, the fourth error estimation packet may be captured by a packet capture module, intercepted by a MAC, or intercepted by any other mechanism known in the arts for intercepting a packet between the time when the fourth software timestamp (ts4) is generated and when the fourth error estimation packet would be sent out on the link at the third dashed line 453. A difference between the fourth interception timestamp (ti4) and the fourth software timestamp (ts4) represents a fourth error estimate (E4). In an alternate embodiment, rather than using the fourth error estimation packet, the first error estimate (E1) may optionally be reused for the fourth error estimate (E4).

In some embodiments, an error estimation system as disclosed herein may be operable to use an error estimate obtained from an error estimation packet (e.g., a difference between an interception timestamp (ti) and a software timestamp (ts) obtained from an error estimation packet) as an estimate of a delay that would have been experienced by a test packet. For example, as shown, the first error estimate E1 may be used to estimate the delay between the first timestamp T1 and the time when the test packet would have appeared on the link. In some embodiments, one or more of these error estimates may be used to improve an accuracy of a metric measured by TWAMP, OWAMP, or another active measurement protocol.

As one example, the forward one-way delay, in some embodiments, may be calculated by using any of Equation 1, Equation 2, or Equation 3, as follows:

$$T2-E2-(T1+E1) \qquad \text{Equation 1}$$

$$T2-E3-(T1+E1) \qquad \text{Equation 2}$$

$$T2-(E2+E3)/2-(T1+E1) \qquad \text{Equation 3}$$

As another example, the reverse one-way delay, in some embodiments, may be calculated by using any of Equation 4, Equation 5, or Equation 6, as follows:

$$T4-E4-(T3+E3) \qquad \text{Equation 4}$$

$$T4-E4-(T3+E2) \qquad \text{Equation 5}$$

$$T4-E4-(T3+(E2+E3)/2) \qquad \text{Equation 6}$$

As yet another example, the two-way delay, in some embodiments, may be calculated by using any of Equation 7 or Equation 8 as follows:

$$T4-E4-(T1+E1) \qquad \text{Equation 7}$$

$$T4-E1-(T1+E1) \qquad \text{Equation 8}$$

Advantageously, incorporating such error estimates may tend to help improve the accuracy of the active measurement protocol metrics. For example, in some embodiments, errors in forward and/or reverse one-way delays may be reduced from on the order of a few to tens of milliseconds to on the order of tens of microseconds, although the scope of the invention is not limited in this respect.

Although the description above is for TWAMP, similar examples also apply to OWAMP, as will be appreciated by those skilled in the arts. In some embodiments, in either TWAMP or OWAMP, or some other active measurement protocol, one or more error estimation packets may be used to estimate a delay which may be used for error reduction.

Embodiments of the invention may be performed by and/or within network devices. As used herein, a network device (e.g., a router, switch, bridge) is a piece of networking equipment, including hardware and software, that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols that communicate with other network devices to exchange routes and select those routes based on one or more routing metrics. Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic. For layer 2 forwarding, the network device can store one or more bridging tables that are used to forward data based on the layer 2 information in this data.

Typically, a network device includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network device through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below.

In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated. The components, features, and specific optional details described herein for an apparatus also optionally apply to the methods described herein which may in embodiments be performed by and/or with such an apparatus.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as tangible, non-transitory computer-readable storage media and non-tangible transitory computer-readable communication or transmission media.

A few representative examples of tangible, non-transitory computer-readable storage media include, but are not limited to, magnetic disks, optical disks, random access memory (RAM), such as static-RAM (SRAM) and dynamic-RAM (DRAM), read only memory (ROM), such as programmable ROM (PROM), erasable-and-programmable ROM (EPROM), and electrically-erasable-and-programmable ROM (EEPROM), flash memory devices, phase-change memory, and the like. The tangible storage media may include one or more solid-state or tangible physical materials, such as, for example, a semiconductor material, a phase change material, a magnetic material, a data storage material, etc. Embodiments pertain to an article of manufacture that includes a tangible non-transitory computer-readable storage media storing a sequence of instructions that if executed by a machine (e.g., a network element, switch, router, end station, host, computer system, or electronic device having at least one microprocessor) causes or results in the machine performing one or more operations or methods disclosed herein. A few representative examples of non-tangible transitory computer-readable transmission media include, but are not limited to, electrical, optical, acoustical or other form of propagated signals—such as carrier waves, infrared signals, and digital signals.

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A method, in a network device, of estimating a time delay between when a software timestamp is generated for an active measurement protocol test packet and when the active measurement protocol test packet is transmitted from the network device onto a link, the method comprising steps of:
generating an error estimation packet;
generating a software timestamp for the error estimation packet;
transmitting the error estimation packet toward a network interface;
intercepting the error estimation packet before it is transmitted from the network device onto the link;
generating an interception timestamp for the error estimation packet in response to intercepting the error estimation packet; and
estimating the time delay based on a difference between the interception timestamp and the software timestamp.

2. The method of claim 1, wherein the step of intercepting the error estimation packet comprises capturing the error estimation packet with a packet capture module.

3. The method of claim 2, wherein the step of capturing the error estimation packet with the packet capture module comprises capturing the error estimation packet based on a source IP address and a source port of the error estimation packet.

4. The method of claim 1, wherein the step of intercepting the error estimation packet comprises intercepting the error estimation packet with a media access controller (MAC).

5. The method of claim 1, wherein the step of intercepting the error estimation packet comprises intercepting the error estimation packet less than one millisecond from when it would be transmitted onto the link.

6. The method of claim 1, wherein the step of generating the error estimation packet comprises generating the error estimation packet less than one second after generating the active measurement protocol test packet.

7. The method of claim 1, wherein the step of generating the error estimation packet comprises generating the error estimation packet less than one second before generating the active measurement protocol test packet.

8. The method of claim 1, further comprising a step of using the estimated time delay to estimate a metric in one of a Two-Way Active Measurement Protocol (TWAMP) and a One-Way Active Measurement Protocol (OWAMP).

9. A network device, the network device operable to be deployed in a network and coupled with another network device by a link, the network device operable to estimate a time delay between when a software timestamp is generated for an active measurement protocol test packet and when the active measurement protocol test packet is transmitted from the network device onto a link, the network device comprising:

a network interface;

an error estimation packet generation module that is operable to generate an error estimation packet;

a software timestamp generation module that is operable to generate a software timestamp for the error estimation packet;

a packet interceptor module that is operable to intercept the error estimation packet before it is transmitted from the network interface onto the link;

an interception timestamp generation module that is operable to generate an interception timestamp for the error estimation packet in response to the interception of the error estimation packet; and an error estimation module that is operable to estimate the time delay based on a difference between the interception timestamp and the software timestamp.

10. The network device of claim 9, wherein the packet interceptor module comprises a packet capture module that is operable to capture the error estimation packet.

11. The network device of claim 10, wherein the packet capture module is operable to capture the error estimation packet based on a source IP address and a source port of the error estimation packet.

12. The network device of claim 9, wherein the packet interceptor module comprises a media access controller (MAC).

13. The network device of claim 9, wherein the packet interceptor module is operable to intercept the error estimation packet less than one millisecond from when it would be transmitted from the network interface onto the link.

14. The network device of claim 9, wherein the error estimation packet generation module is operable to generate the error estimation packet less than one second after generation of the active measurement protocol test packet.

15. The network device of claim 9, wherein the error estimation packet generation module is operable to generate the error estimation packet less than one second before generation of the active measurement protocol test packet.

16. The network device of claim 9, further comprising one of a Two-Way Active Measurement Protocol (TWAMP) module and a One-Way Active Measurement Protocol (OWAMP) module that is operable to receive the estimate of the time delay and to generate a metric based on the estimate of the time delay.

17. A method, in a TWAMP sender network device, of estimating a time delay between when a software timestamp is generated for a TWAMP test packet and when the TWAMP test packet is transmitted from the TWAMP sender network device onto a link, the method comprising steps of:

generating an error estimation packet;

generating a software timestamp for the error estimation packet;

transmitting the error estimation packet toward a network interface;

capturing the error estimation packet before it is transmitted from the network device onto the link, with a packet capture module, based on a source IP address and a source port of the error estimation packet;

generating an interception timestamp for the error estimation packet in response to intercepting the error estimation packet; and estimating the time delay based on a difference between the interception timestamp and the software timestamp.

18. A TWAMP sender network device, the TWAMP sender network device operable to be deployed in a network and coupled with a TWAMP reflector network device by a link, the TWAMP sender network device operable to estimate a time delay between when a software timestamp is generated for a TWAMP test packet and when the TWAMP test packet is transmitted from the TWAMP sender network device onto a link, the TWAMP sender network device comprising:

a network interface;

an error estimation packet generation module that is operable to generate an error estimation packet;

a software timestamp generation module that is operable to generate a software timestamp for the error estimation packet;

a packet capture module operable to capture the error estimation packet before it is transmitted from the network interface onto the link based on a source IP address and a source port of the error estimation packet;

an interception timestamp generation module that is operable to generate an interception timestamp for the error estimation packet in response to the interception of the error estimation packet; and an error estimation module that is operable to estimate the delay based at least in part on a difference between the interception timestamp and the software timestamp.

\* \* \* \* \*